US008503562B2

(12) United States Patent
Levy

(10) Patent No.: US 8,503,562 B2
(45) Date of Patent: Aug. 6, 2013

(54) METHOD AND APPARATUS TO SELECT CODING MODE

(75) Inventor: Shmuel Levy, Qiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 219 days.

(21) Appl. No.: 12/542,941

(22) Filed: Aug. 18, 2009

(65) Prior Publication Data

US 2009/0304105 A1    Dec. 10, 2009

Related U.S. Application Data

(63) Continuation of application No. 10/822,829, filed on Apr. 13, 2004, now Pat. No. 7,684,507.

(51) Int. Cl.
*H04B 7/02*    (2006.01)

(52) U.S. Cl.
USPC ............. 375/267; 375/260; 370/208; 455/69

(58) Field of Classification Search
USPC .................. 375/267, 299, 347; 455/69, 101, 455/272
See application file for complete search history.

(56) References Cited

U.S. PATENT DOCUMENTS

| | | | | |
|---|---|---|---|---|
| 6,131,016 A * | 10/2000 | Greenstein et al. | ............. | 455/69 |
| 6,298,092 B1 * | 10/2001 | Heath et al. | .................. | 375/267 |
| 6,862,440 B2 | 3/2005 | Sampath | | |
| 6,873,606 B2 | 3/2005 | Agrawal et al. | | |
| 6,985,434 B2 * | 1/2006 | Wu et al. | ........................ | 370/208 |
| 7,684,507 B2 * | 3/2010 | Levy | ............................. | 375/267 |
| 2002/0055356 A1 * | 5/2002 | Dulin et al. | ................... | 455/422 |
| 2002/0122383 A1 | 9/2002 | Wu et al. | | |
| 2002/0193146 A1 * | 12/2002 | Wallace et al. | ............... | 455/562 |
| 2004/0071118 A1 | 4/2004 | Dabak et al. | | |
| 2004/0132496 A1 | 7/2004 | Kim et al. | | |
| 2004/0162021 A1 | 8/2004 | Seki et al. | | |
| 2005/0041622 A1 | 2/2005 | Dubuc et al. | | |
| 2005/0041693 A1 | 2/2005 | Priotti | | |
| 2005/0157679 A1 * | 7/2005 | Dulin et al. | ................... | 370/330 |
| 2006/0193268 A1 * | 8/2006 | Walton et al. | ................. | 370/264 |
| 2008/0285670 A1 | 11/2008 | Walton et al. | | |

FOREIGN PATENT DOCUMENTS

| | | | |
|---|---|---|---|
| EP | 1126647 A1 | 8/2001 |
| EP | 1398882 A2 | 3/2004 |
| TW | 421928 B | 2/2001 |
| TW | 510103 B | 11/2002 |
| TW | 525362 B | 3/2003 |
| TW | 576034 B | 2/2004 |
| WO | WO-02091625 A1 | 11/2002 |

OTHER PUBLICATIONS

Office Action of U.S. Appl. No. 12/542,949 dated Apr. 15, 2010.

(Continued)

*Primary Examiner* — Leon-Viet Nguyen
(74) *Attorney, Agent, or Firm* — Schwegman, Lundberg & Woessner, P.A.

(57) ABSTRACT

Briefly, an apparatus and method to transmit data stream by using a multiple-input-multiple-output (MIMO) transmitters receivers system. The MIMO transmitters receivers system may include a coding mode selector to select a coding mode of each orthogonal frequency division multiplexing (OFDM) sub-carrier symbol of a first and second sub-carriers of a data stream according to a feedback data packet having coding information of the OFDM subcarrier symbol. The coding mode may be selected from a diversity coding mode and a multiplexing coding mode.

7 Claims, 2 Drawing Sheets

OTHER PUBLICATIONS

"U.S. Appl. No. 13/089,043, Response filed Dec. 4, 2012 to Non Final Office Action mailed Sep. 4, 2012", 11 pgs.

Andrews, Jeffrey G, et al., "Fundamentals of WiMAX: Understanding Broadband Wireless Networking", (2007), 190-197.

Bangerter, B., et al., "High-Throughput Wireless LAN Air Interface", Intel Technology Journal, 7(3), http://developer.intel.com/technology/itj/index.htm, (Aug. 9, 2003), 47-57.

Heath, R W, et al., "Switching between multiplexing and diversity based on constellation distance.", Proceedings, Allerton Conference on Communications, Control, and Computing., (Sep. 2000), 212-221.

Zheng, L, et al., "Diversity and multiplexing: A fundamental tradeoff in multiple antenna channels.", IEEE Transactions on Information Theory, 49(5), (May 2003).

* cited by examiner

METHOD AND APPARATUS TO SELECT CODING MODE

CROSS REFERENCE TO RELATED APPLICATIONS

This application is a continuation of U.S. patent application Ser. No. 10/822,829, filed on Apr. 13, 2004, now issued as U.S. Pat. No. 7,684,507, entitled "METHOD AND APPARATUS TO SELECT CODING MODE," which is incorporated herein by reference in its entirety.

BACKGROUND OF THE INVENTION

In wireless local area network (WLAN) communication systems, for example, local area network (LAN), radio transmitters may transmit and/or receive radio frequency (RF) signals through one or more antennas. Some wireless communication devices may include multiple antennas, for example two or more antennas. Those wireless communication devices may include multiple-input-multiple-output (MIMO) modulation and/or coding to control receiving and transmitting of RF signals through the multiple antennas.

MIMO system may include a diversity MIMO system or multiplexing MIMO system. In the diversity MIMO system incoming bits may be coded over multiple transmitting antennas to gain sensitivity by exploiting multi path propagation channel property. In the multiplexing MIMO system the multiple transmitting antennas may be used to convey multiple modulated streams of data. In this MIMO system spatial decoding methods may be used to decode the modulated data streams.

A MIMO system may use orthogonal frequency division multiplexing (OFDM) systems coding for multiplexing or diversity evenly on the entire OFDM sub-carriers symbol without any discrimination. A failure to multiplex in at least some bits of the OFDM sub-carriers symbol may cause all bits of the OFSM sub-carriers symbol to be in error.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
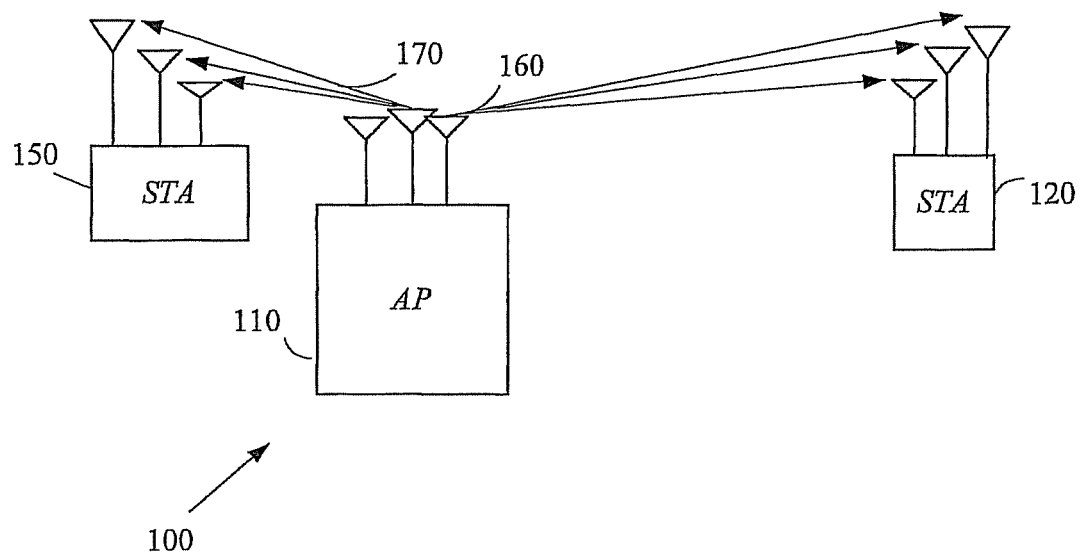
FIG. 1 is an illustration of a portion of WLAN communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, "plurality of mobile stations" describes two or more mobile stations.

It should be understood that the present invention may be used in a variety of applications. Although the present invention is not limited in this respect, the circuits and techniques disclosed herein may be used in many apparatuses such as transmitters of a radio system. Transmitters intended to be included within the scope of the present invention may include, by way of example only, wireless local area network (WLAN) transmitters, two-way radio transmitters, digital system transmitters, analog system transmitters, cellular radiotelephone transmitters and the like.

Types of WLAN transmitters intended to be within the scope of the present invention include, although are not limited to, transmitters for transmitting spread spectrum signals such as, for example, Frequency Hopping Spread Spectrum (FHSS), Direct Sequence Spread Spectrum (DSSS) orthogonal frequency division multiplexing (OFDM) transmitters, MIMO transmitters, and the like.

Some embodiments of the invention may be implemented, for example, using a machine-readable medium or article which may store an instruction or a set of instructions that, if executed by a machine (for example, by a station of WLAN, and/or by other suitable machines), cause the machine to perform a method and/or operations in accordance with embodiments of the invention. Such machines may include, for example, any suitable processing platform, computing platform, computing device, processing device, computing system, processing system, computer, processor, or the like, and may be implemented using any suitable combination of hardware and/or software. The machine-readable medium or articles may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Turning to FIG. 1, a wireless communication system, for example WLAN 100, in accordance with an exemplary embodiment of the invention, is shown. Although the scope of the present invention is not limited in this respect, WLAN 100 may include station (STA) 150, station (STA) 120 and access point (AP) 110. According to embodiments of the invention, at least some of the WLAN stations and APs for example, stations 120, 150 and AP 110 may include a MIMO system and at least two antennas.

Although the scope of the present invention is not limited in this respect, at least one transmitter among transmitters of stations 120 and/or 150 and/or AP 110 may be configured to adaptively code a sub-carrier either in diversity mode or in the multiplexing mode according to the sub-carrier channel state information (CSI), if desired.

Figure 2:
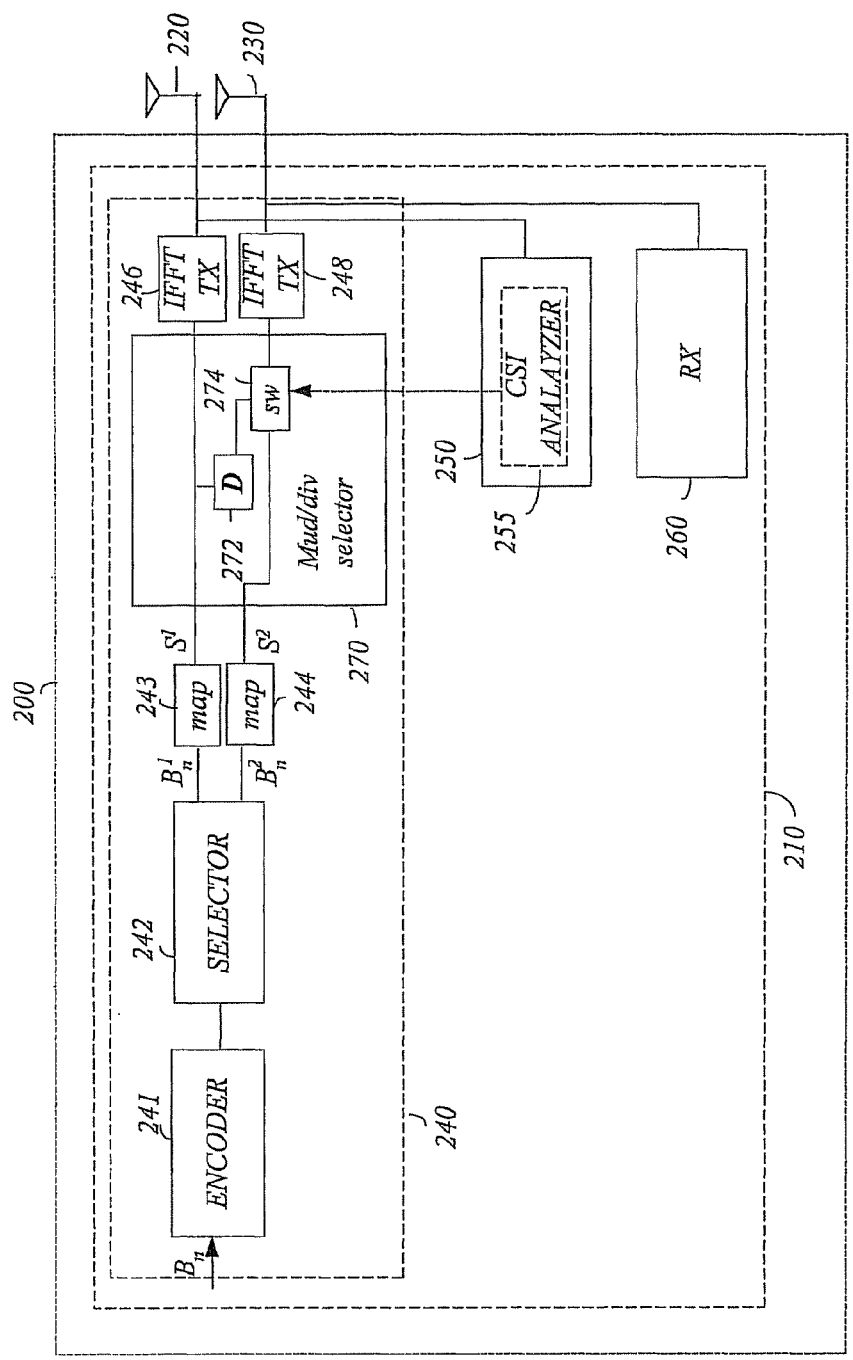
FIG. 2 is a block diagram of a transceiver according to exemplary embodiments of the present invention.

Turning to FIG. 2, a block diagram of a transceiver 200 according to exemplary embodiments of the present invention is shown. Although the scope of the present invention is not limited in this respect, transceiver 200 may include MIMO system 210 and antennas 220 and 230. Although the scope of the present invention is not limited in this respect, exemplary MIMO system 210 may include a transmitter system 240 and receivers (RX) 250, 260. In some embodiments of the invention, at least one of the receivers 250, 260 may include carrier channel state information (CSI) analyzer 255, if desired.

Although the scope of the present invention is not limited in this respect, transmitter system 240 may include an encoder 241, a selector 242, mappers 243, 244, a mode selector 270 and Inverse Fast Furrier Transformer transmitters (IFFT TX) 246, 248. In addition, mode selector 270 may include a delay (D) 272 and a switch (SW) 274, if desired.

Although the scope of the present invention is not limited in this respect, a data stream that may include two or more bits $B_n$ may be inputted to encoder 241. Although the scope of the present invention is not limited in this respect, encoder 241 may be a convolution code encoder, a Turbo encoder, a Low-Density Parity Check (LDPC) encoder, or the like. In embodiments of the invention encoder 241 may encode the data stream. The encoded data stream may be inputted to selector 242. In some embodiments of the invention selector 242 may provide at least two data streams $B^1_n$ and $B^2_n$ wherein the superscript number (e.g. 1, 2) may be the number of the data stream and the subscript number (e.g. n) may be the bit number of the data stream.

Although the scope of the present invention is not limited in this respect, mappers 243 and 244 may received the data streams $B^1_n$ and $B^2_n$, respectively, and may provide two or more OFDM sub-carriers, symbols $S^1$ and $S^2$, if desired. For example, in some embodiments of the invention mappers 243 and 244 may map OFDM sub-carriers symbols from binary domain to a complex domain. For example, symbol (e.g. encoded in rate ½) "00" may be mapped to 0° (e.g. 1+j*0), symbol "01" may be mapped to 90° (e.g. +j), symbol "10" may be mapped to 180° (e.g. −1+j*0) and symbol "11" may be mapped to 270° (e.g. 1−j).

Although the scope of the present invention is not limited in this respect, the OFDM sub-carriers symbols (e.g. $S^1$ and $S^2$) may be inputted to coding mode selector 270. In some embodiments of the invention, coding mode selector 270 may adaptively select a coding mode of the OFDM sub-carrier symbols according to a received CSI which relates to the OFDM sub-carrier. In those embodiments, coding mode selector 270 may adaptively code the OFDM sub-carrier either in diversity mode or in the multiplexing mode, if desired.

Although the scope of the present invention is not limited in this respect, in some embodiments of the invention, CSI may be received, for example, from AP 110, or from at least one of stations 150 and/or 120. RX 250 may receive the CSI and CSI analyzer 255 may analyze the received CSI. In addition, CSI analyzer 255 may alternate switch (SW) 274 to provide symbols with delay (e.g. diversity mode) or symbols from mapper 244 (e.g. multiplexing mode) to IFFT TX 248, if desired. In some embodiments of the invention, the analyzed information that may be, for example, eighen-channel value, a signal to noise ratio (SNR) or the like. In other embodiments of the invention, CSI analyzer 255 may analyze the transmitted OFDM sub-carrier symbol for example, based on channel estimation and/or SNR of the estimated channel, if desired.

Although the scope of the present invention is not limited in this respect, CSI analyzer 255 of RX 250 and/or RX 260 may receive a modulated signal from at least one of the WLAN stations and may estimate the CSI according to the following function, if desired:

$$H^*H = \begin{bmatrix} h_{11} & h_{12} \\ h_{21} & h_{22} \end{bmatrix}^* \begin{bmatrix} h_{11} & h_{12} \\ h_{21} & h_{22} \end{bmatrix} = Q \begin{bmatrix} \lambda_1 & \\ & \lambda_2 \end{bmatrix} Q^H$$

wherein,

H*H may describe the CSI matrix;

h—may describe the channel;

Q—may describe an eighen-channel matrix; and

λ—may described an eighen-value that may be equivalent to the SNR.

Although the scope of the present invention is not limited in this respect, in an exemplary n×m MIMO system, n may be the number of transmitters, m may be the number of receivers and the maximum dimension of CSI matrix H*H may be calculated according to the following equation: p=dim(H*H') <=min(n,m). In addition, the CSI matrix may support up to p spatial eighen-channels (e.g. orthogonal channels), for example, the CSI matrix may support up to p order of OFDM symbols in multiplexing mode, if desired. In addition, the ability of transmitter system 240 to operate in multiplexing mode may be tested by choosing the number of eighen-channels that support the sensitivity required for transmitting in multiplexing mode.

Although the scope of the present invention is not limited in this respect, CSI analyzer 255 may analyze the CSI and may command mode selector 270 to select the desired coding method, for example, diversity method, multiplexing method or the like. In some embodiments, CSI analyzer 255 may provide indication to switch 274 to select the multiplexing mode, if k,mux OFDM sub-carrier symbols may support p,min multiplexing order. In those embodiments, the sub-carrier symbols that support the p,min multiplexing order may be transmitted in the multiplexing mode and the other sub-carriers symbols may be transmitted in diversity mode. In embodiments of the invention, a single bit may be used to switch between the modes. For example, "1" may indicate to switch transmitter system 240 to multiplexing mode and "0"

may indicate to switch transmitter system 240 to diversity mode, although the scope of the invention is not limited in this respect.

Although the scope of the present invention is not limited in this respect, IFFT TX 246 may transmit OFDM sub-carrier symbols $S_1$ via antenna 220 and IFFT TX 248 may transmit the OFDM sub carrier symbols either in diversity mode and/or in multiplexing mode (e.g. $S_2$) via antenna 230. Although the scope of the present invention is not limited in this respect, antenna 220 and/or antenna 230 may include an internal antenna, or an omni-directional antenna, or a monopole antenna, or a dipole antenna, or an end fed antenna or a circularly polarized antenna, or a micro-strip antenna, or a diversity antenna, a dual antenna, an antenna array or the like.

Although the scope of the present invention is not limited in this respect, in another embodiment of the invention, transmitter system 240 may transmit coding grouping information (CGI) to a receiver of other station. For example, the CGI may include coding information that may be related to OFDM sub-carrier (k). For example, CGI may include a single bit (e.g. "1"=multiplexing mode, "0"=diversity mode) that may be described by the decoding mechanism.

Although the scope of the present invention is not limited in this respect, for example, in a receiver of MIMO system OFDM sub-carriers symbols may be grouped into at least two sub-modes, according to the transmitter decoding information. In some embodiments of the invention, the "1's" sub-carriers may be decoded according to multiplexing code decoding scheme such as, for example Minimum Mean Squared Error (MMSE) or the like and "0's" sub-carriers may be decoded according to diversity coding schemes such as, for example, maximal ratio combining (MRC) or the like.

In embodiments of the invention, a feedback data packet may be sent from a receiving station to a transmitting station. The feedback data packet may include control bits such as, for example, the CGI that may include the coding information of the OFDM sub-carrier symbol. In some embodiments of the invention, in order to decrease the number of CGI bits in the feedback packet, the OFDM sub-carrier symbols may be divided into predefined sub-groups wherein, a single CGI bit may be dedicated to a sub-group and/or to a number of sub-groups, if desired. In those exemplary embodiments of the invention, the number of coding information bits may be proportional to the number of the predetermined sub-groups. For example, a group of 54 sub-carriers may be divided to two sub-groups of 27 sub-carriers, thus, the feedback data packet may include two CGI bits, if desired.

Although the scope of the present invention is not limited in this respect, transmitter system 240 may use a uniform modulation schema, for example 16QAM, 64QAM, or the like, with adaptive spatial multiplex, on the OFDM sub-carrier symbol.

Figure 3:
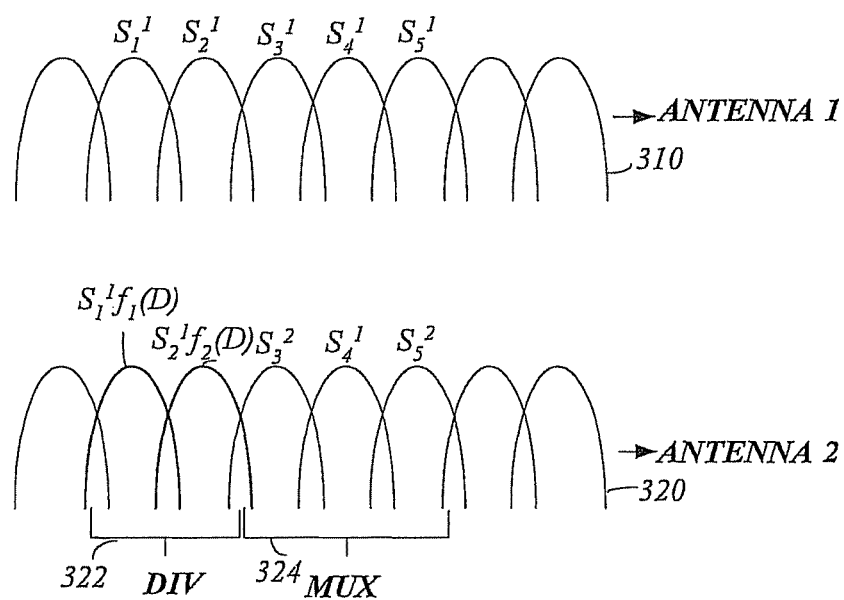
FIG. 3 is an illustration of OFDM sub-carrier symbols according to exemplary embodiments of the present invention.

Turning to FIG. 3, an illustration of OFDM sub-carrier symbols according to exemplary embodiments of the present invention is shown. Although the scope of the present invention is not limited in this respect, OFDM sub carriers 310 symbols, for example, $S_1^1, S_2^1, S_3^1, S_4^1, S_5^1$ may be transmitted via a first antenna (e.g. antenna 220). In some embodiments of the invention, OFDM sub carriers 320 symbols may be transmitted via a second antenna (e.g. antenna 230). For example, OFDM sub carrier symbols 320 may be divided into two groups. The first group, group 322, may include OFDM sub carriers symbols $S_1^1 f_1(D)$ and $S_2^1 f_2(D)$ that may be transmitted in diversity (DIV) mode. It should be understood that $S_1^1$ may represent a first symbol of group 1 and $f_1(D)$ may represent a delay (D) function of group 1, if desired. For example, the delay function $f_1(D)$ may be $f_1^{-j2\pi f_1 d}$. The second group, group 324 may include for example, OFDM sub carriers symbols $S_3^2, S_4^1, S_5^2$, that may be transmitted in multiplexing (MUX) mode, although the scope of the present invention is not limited in this respect.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method for transmitting orthogonal frequency division multiplexed (OFDM) symbols in accordance with a multiple-input-multiple-output (MIMO) technique performed by a transmitter coupled to first and second antennas, the method comprising:

selecting a coding mode for groups of subcarriers based on channel state information (CSI) indicating channel state for the groups of subcarriers, wherein the coding mode is selected from a diversity mode and a multiplexing mode;

mapping symbols of a data stream to generate first mapped symbols and second mapped symbols;

transmitting the first mapped symbols with the first antenna on subcarriers that include the groups of subcarriers selected for the diversity mode and the groups of subcarriers selected for the multiplexing mode;

transmitting at least some of the first mapped symbols with the second antenna on the groups of subcarriers selected for the diversity mode, transmission of the at least some of the first mapped symbols with the second antenna being delayed with respect to transmission of the first mapped symbols with the first antenna, the delay being greater than zero and less than a cyclic prefix length;

transmitting the second mapped symbols with the second antenna on the groups of subcarriers selected for multiplexing mode; and transmitting coding group information (CGI) to indicate the selected coding mode for each group of subcarriers.

2. The method of claim 1, further comprising: receiving the CSI indicating the channel state for the groups of suhcarriers from one or more receiving stations, wherein the first mapped symbols are provided by a first mapper and the second mapped symbols are provided by a second mapper, wherein the transmitter includes a delay element to delay the at least some of the first mapped symbols provided by the first mapper by the delay, and wherein the method includes configuring a switch to:

provide the at least some of the first mapped symbols from the delay element for the transmission by the second antenna on the groups of subcarriers selected for the diversity mode; and provide the second mapped symbols from the second mapper for the transmission with the second antenna on the groups of subcarriers selected for the multiplexing mode.

3. The method of claim 1, comprising:

coding a first subset of subcarriers within an OFDM symbol of an orthogonal frequency division multiplexing channel in the multiplexing mode; and coding a second subset of subcarriers within an OFDM symbol in the diversity mode.

4. A wireless communication device for transmitting orthogonal, frequency division multiplexed (OFDM) symbols in accordance with a multiple-input-multiple-output (MIMO) technique using first and second antennas, the wireless communication device comprising:

a coding mode selector to select a coding mode for groups of subcarriers based on channel state information (CSI) indicating channel state for the groups of subcarriers, wherein the coding mode is selected from a diversity mode and a multiplexing mode; and a multiple-input-multiple-output (MIMO) transmitter system to:

map symbols of a data stream to generate first mapped symbols and second mapped symbols;

transmit the first mapped symbols with the first antenna on subcarriers that include the groups of subcarriers selected for the diversity mode and the groups of subcarriers selected for the multiplexing mode;

transmit at least some of the first mapped symbols with the second antenna on the groups of subcarriers selected for the diversity mode, transmission of the at least some of the first mapped symbols with the second antenna being delayed with respect to transmission of the first mapped symbols with the first antenna, the delay being greater than zero and less than a cyclic prefix length;

transmit second mapped symbols with the second antenna on the groups of subcarriers selected for multiplexing mode; and transmit coding group information (CGI) to indicate the selected coding mode for each group of subcarriers.

5. The wireless communication device of claim 4, wherein the MIMO transmitter system comprises:

a first transmitter to transmit the first mapped symbols; and a second transmitter to transmit the at least some of the first mapped symbols and the second mapped symbols.

6. The wireless communication device of claim 4, wherein the device is arranged to receive the CSI from one or more receiving stations, wherein the wireless communication device comprises a first and a second mapper, a delay element and a switch, wherein the first mapped symbols are provided by the first mapper and the second mapped symbols are provided by the second mapper, wherein the delay element is arranged to delay the at least some of the first mapped symbols provided by the first mapper by the delay, and wherein the device arranged to configure the switch to:

provide the at least some of the first mapped symbols from the delay element for the transmission by the second antenna on the groups of subcarriers selected for the diversity mode; and provide the second mapped symbols from the second mapper for the transmission with the second antenna on the groups of subcarriers selected for the multiplexing mode.

7. The wireless communication device of claim 4, wherein the transmitter system comprises:

a channel state analyzer to select the coding mode for each group of subcarriers based on the CSI for each group of subcarriers.

* * * * *

UNITED STATES PATENT AND TRADEMARK OFFICE
CERTIFICATE OF CORRECTION

PATENT NO. : 8,503,562 B2  
APPLICATION NO. : 12/542941  
DATED : August 6, 2013  
INVENTOR(S) : Shmuel Levy Page 1 of 1

It is certified that error appears in the above-identified patent and that said Letters Patent is hereby corrected as shown below:

On the Title Page

On page 2, Item 56, under "Other Publications", in column 1, line 3, delete "G," and insert --G.,--, therefor On page 2, Item 56, under "Other Publications", in column 2, line 1, delete "R W," and insert --R. W.,--, therefor On page 2, Item 56, under "Other Publications", in column 2, line 3, delete "Computing.," and insert --Computing,--, therefor On page 2, Item 56, under "Other Publications", in column 2, line 5, delete "L," and insert --L.,--, therefor In the Claims In column 6, line 39, in claim 2, after "comprising:", insert --¶--, therefor In column 6, line 40, in claim 2, delete "suhcarriers" and insert --subcarriers--, therefor In column 6, line 64, in claim 4, delete "orthogonal," and insert --orthogonal--, therefor Signed and Sealed this  
Tenth Day of December, 2013

Margaret A. Focarino  
*Commissioner for Patents of the United States Patent and Trademark Office*